W. L. PATTERSON.
APPARATUS FOR TRANSPORTING CRIPPLED OR DAMAGED AUTOMOBILES.
APPLICATION FILED APR. 1, 1918.
1,374,224.
Patented Apr. 12, 1921.
3 SHEETS—SHEET 1.
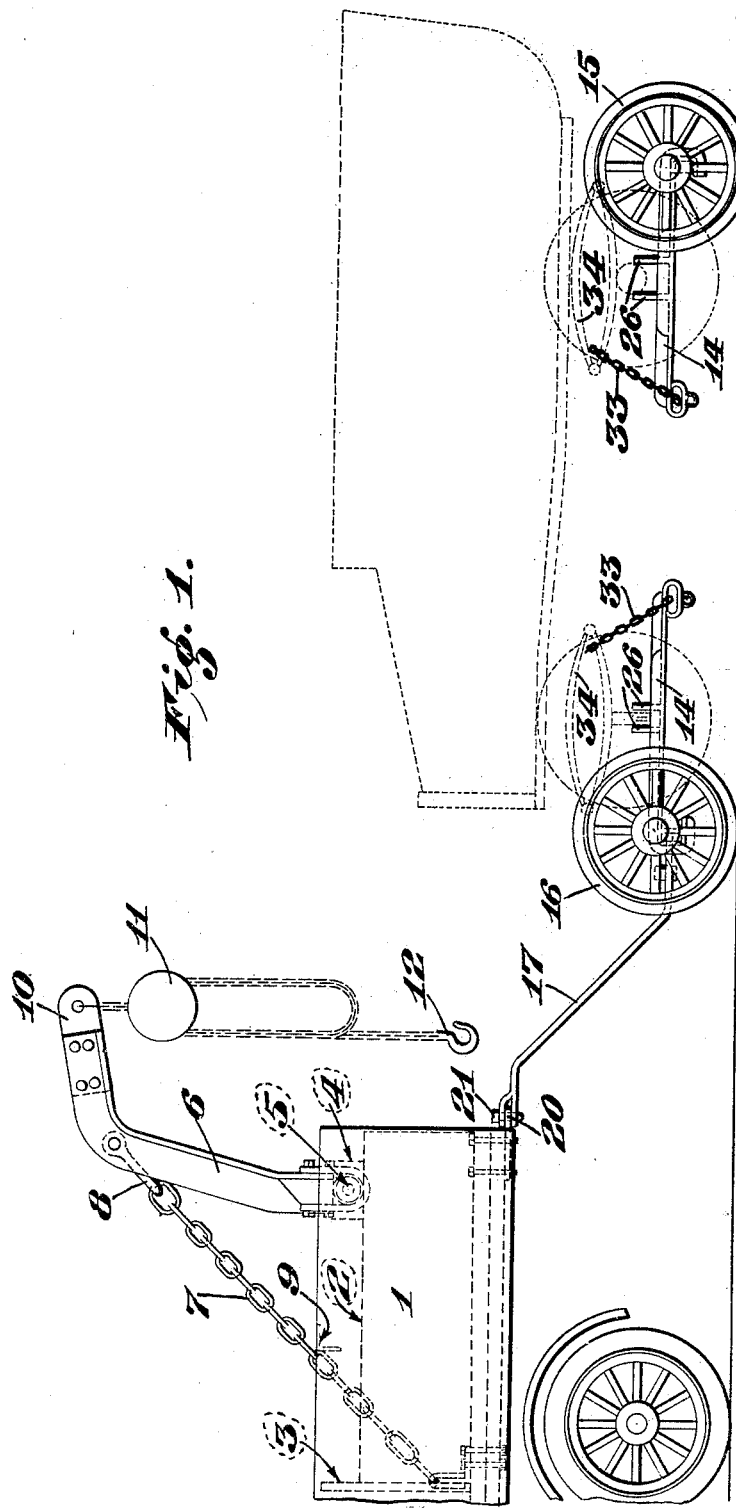
INVENTOR:
William Lacy Patterson,
by George A. Pennington,
his ATTORNEY.

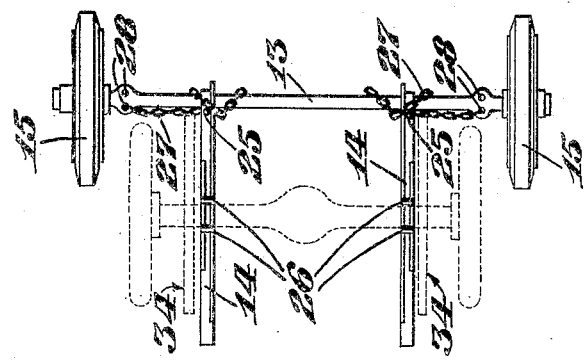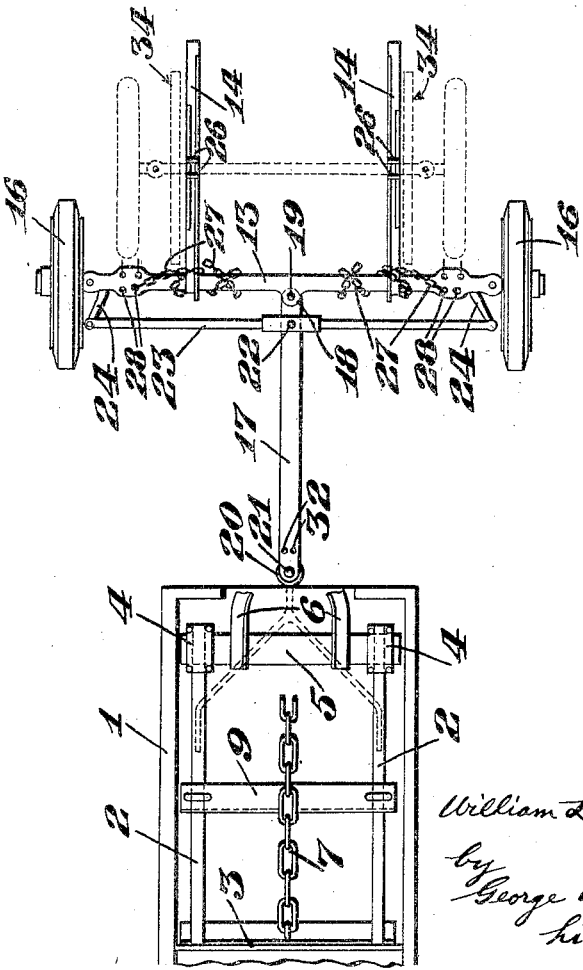

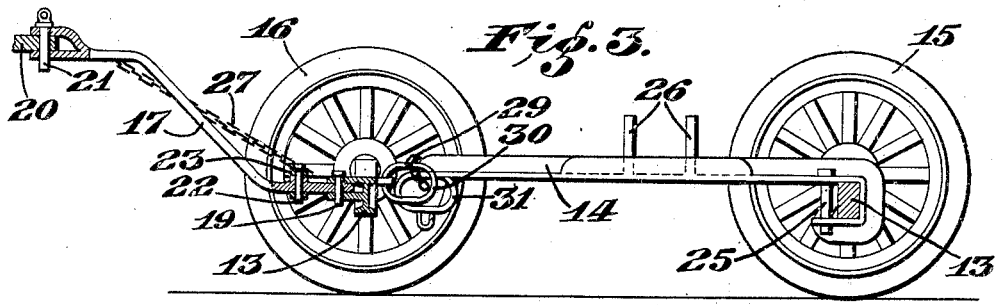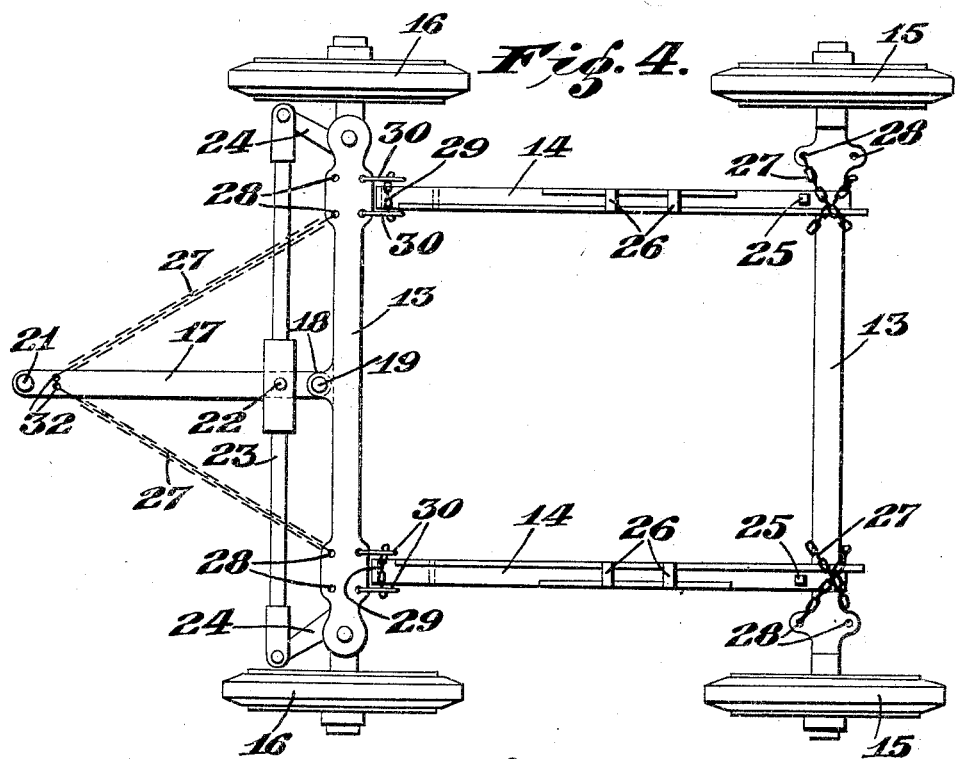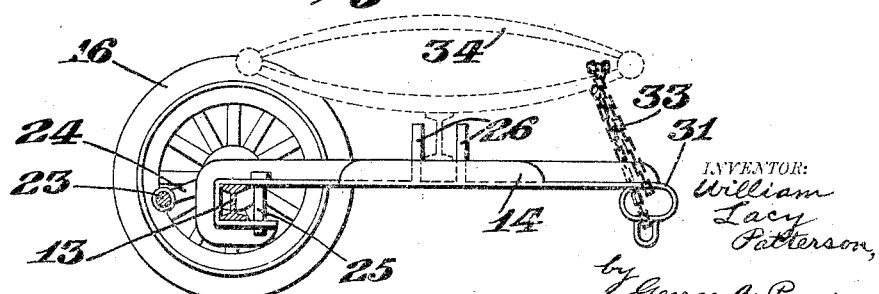

UNITED STATES PATENT OFFICE.

WILLIAM LACY PATTERSON, OF ST. LOUIS, MISSOURI, ASSIGNOR TO HENRY MOTOR SERVICE COMPANY, OF ST. LOUIS, MISSOURI, A CORPORATION OF MISSOURI.

APPARATUS FOR TRANSPORTING CRIPPLED OR DAMAGED AUTOMOBILES.

1,374,224. Specification of Letters Patent. Patented Apr. 12, 1921.

Application filed April 1, 1918. Serial No. 225,869.

*To all whom it may concern:*

Be it known that I, WILLIAM LACY PATTERSON, a citizen of the United States, residing in the city of St. Louis and State of Missouri, have invented new and useful Improvements in Apparatus for Transporting Crippled or Damaged Automobiles, of which the following is a specification.

This invention relates to an apparatus or ambulance for transporting crippled or damaged automobiles and other like wheeled vehicles. It has for its principal objects to produce an apparatus or equipment for use in connection with a repair service and towing car, truck, or other automotive or locomotive, which is easily handled and manipulated, and minimizes manual labor, and also obviates the necessity for removing any part or parts of the crippled or damaged vehicle. Other objects and advantages to be attained will hereinafter more fully appear in the following description.

The invention resides, essentially, in the combination of a hoisting apparatus and a novel construction and arrangement of correlated trundling frames or trucks, which may be used singly or in conjunction with each other, and in connection with a suitable automotive or locomotive, whereby the crippled or damaged vehicle may be raised and transported with facility and without further injury thereto. The invention further consists in the parts and in the combinations and arrangements of parts hereinafter described and set forth in the appended claims.

In the accompanying drawings, forming part of this specification and illustrating a practical adaptation of the invention,—

Figure 1 is a view, in side elevation, showing the rear portion of a repair service and towing car, and the trundling frames or trucks as placed under an automobile and attached ready for its transportation;

Fig. 2 is a plan view thereof, a portion of the hoisting device being removed;

Fig. 3 is a longitudinal, vertical section through the two trundling frames or trucks as coupled together to drag behind the towing car when taken out to bring in a crippled or damaged automobile or the like;

Fig. 4 is a plan view thereof; and

Fig. 5 is a section through one of the trundling frames or trucks, detached, and showing more clearly the preferred manner of mounting the axle of the automobile thereon and the connection between the frame and the vehicle spring.

Referring now to the drawings, the numeral 1 indicates the rear portion of the body of an ordinary repair service and towing car or truck (see Figs. 1 and 2). In the body 1 is a supporting frame comprising side plates or members 2 and a cross plate or member 3. On the outer end portions of the side plates 2 are bearings 4 for the pivotal mounting of a supporting bar or shaft 5 of a derrick 6, whereby the latter may be folded back on the body 1 when not in use; and whereby said derrick may be supported in raised position, in use, by a chain 7 which is fastened at one end near the cross plate 3 and bottom of the body 1 and at its opposite end to a clevis 8 or the like on the derrick. To relieve the strain on the fastening at the inner end of the chain, it is passed over, and in contact with, a cross bar 9 or other suitable support on the body 1.

From the angular extension 10 of the derrick 6 is suspended a chain block and fall or other suitable hoisting contrivance 11 having a hook 12 or other suitable grapple for attachment to the automobile or other vehicle to be lifted for the purpose of placing thereunder the trundling frames or trucks now to be described.

In the equipment there will be two of the said trundling frames or trucks, the one, hereinafter referred to as the forward truck, being capable of steering, and the other, hereinafter referred to as the rear truck, being merely a follower or drag.

In general construction and arrangement, however, as far as adjustability and the method of mounting and attaching the automobile are concerned, the trucks are alike. That is, each comprises a similar axle 13 on which a pair of supporting arms or cantaliver-bars 14 are detachably and adjustably mounted, the only difference being, that on the one axle, the wheels 15 are mounted as on the ordinary rear axle of an automobile or the like, while on the other, the wheels 16 are mounted on knuckled stub-spindles as on the ordinary front axle.

The axle of the front truck has a draft-bar 17 hingedly connected thereto, as at 18, the pivot-bolt 19 being preferably removable. This draft-bar 17 has its outer end portion suitably arranged and provided for coupling with the towing car. As shown, it is bifurcated for engagement with an eye or link 20 projecting rearward from the body of the towing car, and it is apertured for the reception of a removable coupling-pin 21. It is also pivotally attached, through the medium of a removable bolt 22, to the middle of the connecting bar 23, which latter is pivotally attached at its ends to the forwardly projecting arms 24 of the steering knuckles.

The object in having the bolts 19 and 22 removable is to readily detach the draft-bar 17 from the axle, so that it will be out of the way while the truck is being placed under the automobile, as will be presently set forth.

As shown, the cantaliver-bars or supporting arms 14 are of angle-iron section, and they may be either L-shape or channeled, as desired. The end portions which are attached to the axle are rebent to hook around it with sufficient looseness to enable them to slide easily thereon, and they are provided with removable retaining bolts 25.

The cantaliver-bars or supporting arms 14 are provided, at about the middle thereof, with suitable seats, preferably formed by upstanding lugs 26 which straddle the axle of the automobile when seated on the members 14, as will be later more fully set forth and as shown in Figs. 1 and 2.

Any suitable means may be provided for fastening the members 14 in transversely adjusted relation on the truck axle, but a convenient method is to employ chains or cables 27 which are secured, either permanently or detachably, in eyes 28 provided therefor on the axle and wrapped about said members 14, as with a half-hitch or the like, so as to effectually tie them in place. A suitable number of these chains 27 are used, and by permanently attaching them at one end to the axle they are always in place when needed. However, they may be detachable and carried to the job on the service and towing car.

In taking the apparatus out on a job, the two trucks or trundling frames are fastened together as shown in Figs. 3 and 4. A convenient way of doing this is to remove the cantaliver-bars or supporting members 14 from the front axle and carry them in the towing car. The free end portions of the members 14 on the rear axle are then secured to the front axle by passing chains or cables 29 through loops or rings 30 on the axle and loops or eyes 31 provided therefor on the ends of said members 14 and hitching or tying them in place. In this way, the parts are held together, yet with sufficient looseness to afford the requisite flexibility to allow the trucks to make a turn in following the towing car. To insure the trucks tracking properly in a straight line in following the towing car, the draft-bar 17 is held in substantially fixed relation to, or with but slight swinging play with respect to, the front truck axle by the chains 27 which are brought diagonally therefrom and secured at their outer ends in eyes 32 provided therefor on the draft-bar 17 and thereby serve as stays; but these chains are detached from the draft-bar 17 to leave it free to swing with the steering gear and are used to anchor the cantaliver-bars 14 in place, when the truck is placed into service to transport the crippled or damaged vehicle, as will now be described.

On arrival at the place of operation, the draft-bar 17 is detached from the towing car, the chains 27 detached from the draft-bar 17, and, if necessary, the draft-bar is detached from the axle of the truck. The derrick 6 is then set up into operative position and the automobile or other vehicle to be handled is raised at one end through the medium of the hoisting device 11. The front trundling frame or truck is then placed under the automobile so that the axle of the latter may be let down between the lugs 26 on the cantaliver-bars 14. Then the said members 14, in substantially horizontal position, are fastened, as by chains 33, at their free ends, to the springs 34 or to some other suitable or convenient part of the frame or body of the automobile. If it is not convenient to fasten to the springs of the automobile, a spring may be provided in the tying or fastening device 33. Hence, when the hoisting device 11 is released, the weight of the automobile is carried by the truck or trundling frame with resilient cantaliver effect. The rear trundling frame or truck may be placed in position in a like manner, in which case the automobile is carried entirely free of its own wheels as shown in Figs. 1 and 2.

In some cases, however, it is only necessary to truck one end of the automobile to be transported, and in such a case only the front or steering truck will be used and the automobile allowed to ride at one end on its own wheels. Obviously, therefore, if the front end is broken down or crippled, that end only will be trucked. If it should happen to be the rear end, the steering gear will, of course, be locked in straight-away position and the rear end of the automobile trucked so that it may be towed backward. Should there be no occasion to use the rear trundling frame or truck, it is towed in by fastening it to the rear of the automobile being transported.

By the provision of an apparatus according to the present invention, the entire job may be easily handled by one operator, and a crippled or damaged automobile or the like quickly brought in; and this without further injury thereto or necessitating the removal of any part or parts of it. So, too, the structure, while possessing stability and compactness, is flexible and resilient, owing to the peculiar cantaliver effect obtained after the weight of the vehicle is placed on the truck or trucks.

Obviously, the apparatus admits of considerable modification and changes without in the least departing from the spirit and purpose of the invention as defined by the appended claims. Therefore, it is not limited to the specific construction and arrangement shown in the drawings.

What is claimed is:

1. In an apparatus of the character described, a trucking device comprising a wheeled axle, a pair of supporting bars adjustably mounted at one end on said axle so as to be movable toward and from each other, and having means at their opposite ends for flexible attachment to the vehicle to be transported, said bars having means between their ends for engagement with the axle of the vehicle.

2. In an apparatus of the character described, a trucking apparatus comprising a pair of wheeled axles, means for detachably connecting said axles together, and one of said axles being steerable, cantaliver supporting bars detachably and adjustably secured at one end to said axles, said bars having seats thereon at their middle portions for the axles of a vehicle to be transported, and means for effecting a flexible and resilient connection between the free ends of said cantaliver supporting bars and the vehicle.

3. A transporting apparatus for crippled or damaged automobiles and the like, comprising a steerable wheeled axle, a detachable draw-bar for engagement with said axle and the steering gear, cantaliver supporting bars adjustably mounted on said axle and having means for seating thereon the axle of the vehicle to be transported, a system of flexible connecting elements attached to said axle and adapted for attachment with said draw-bar to secure alinement in towing the apparatus unloaded, and to fasten said cantaliver supporting bars in place on said axle to carry the load, and a follower wheeled axle likewise equipped with cantaliver supporting bars, flexible connecting elements attached to said second-mentioned axle and adapted to fasten said cantaliver supporting bars thereon, means for detachably and flexibly securing the two axles together to tow the same unloaded, and means for securing a flexible and resilient connection between said cantaliver supporting members and the vehicle loaded thereon.

4. In a transporting apparatus for crippled automobiles and the like, a wheeled axle, cantaliver supporting bars detachably and adjustably mounted thereon so as to be movable toward and from each other, said bars having upstanding pairs of lugs thereon constituting seats for the axle of the vehicle to be transported, and means for effecting a flexible and resilient connection between the free ends of said cantaliver supporting bars and the vehicle loaded thereon.

Signed this 18th day of March, 1918, at the city of St. Louis, State of Missouri.

WILLIAM LACY PATTERSON.